G. H. SCHMAND.
CANDY LIFTER.
APPLICATION FILED JAN. 10, 1920.
1,385,893.
Patented July 26, 1921.
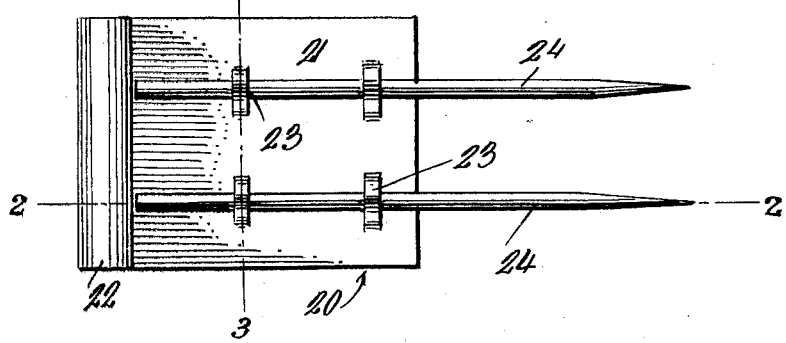
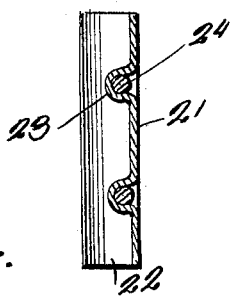
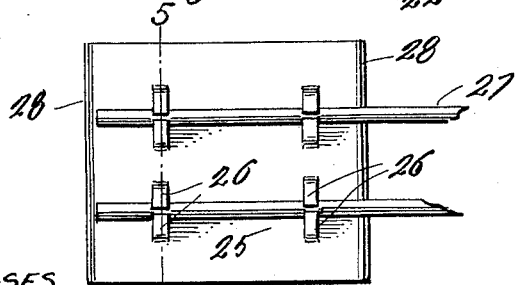 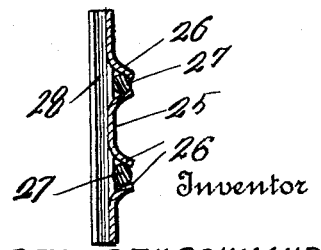
WITNESSES
Guy M. Spring
S. M. McColle
Inventor
GEORGE H. SCHMAND
By Richard B. Owen
Attorney

UNITED STATES PATENT OFFICE.

GEORGE H. SCHMAND, OF LITTLE ROCK, ARKANSAS.

CANDY-LIFTER.

1,385,893.   Specification of Letters Patent.   Patented July 26, 1921.

Application filed January 10, 1920. Serial No. 350,604.

*To all whom it may concern:*

Be it known that I, GEORGE H. SCHMAND, a citizen of the United States, residing at Little Rock, in the county of Pulaski and State of Arkansas, have invented certain new and useful Improvements in Candy-Lifters, of which the following is a specification.

This invention relates to an improved candy lifter, particularly adapted for use in connection with handling the candies from the candy cutting machine.

The principal object of the invention is to provide a candy lifter or handler whereby the candies may be sanitarily conveyed from one place to another and whereby sticks associated with the lifter are removable therefrom to provide finger sticks or handles adapted to be permanently attached to butter-cups, kisses or other candies.

With the foregoing and other objects in view, which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings:

Figure 1 represents a plan view of one form of lifter constituting this invention.

Fig. 2 is a transverse section taken on the line 2—2 of Fig. 1.

Fig. 3 is a longitudinal section taken on the line 3—3 of Fig. 1.

Fig. 4 is a plan view showing a different form of the lifter with the sticks broken off; and Fig. 5 is a section taken on the line 5—5 of Fig. 4.

The lifter 20 constituting this invention, one form of which is illustrated in Figs. 1 to 3 and a slightly different form in Figs. 4 to 5, comprises an elongated supporting member, preferably a sheet metal plate 21 which is designed to be of a length corresponding to a length of the cutter such as is used for cutting candy kisses, etc. This plate 21 is provided with a plurality of series of out-struck loops or stirrups 23, two of which are shown in each series arranged transversely of the plate and alined with each other. These alining loops 23 are designed to receive and support pins or sticks 24 constructed of any suitable material, which are intended as supports for the pieces of candy cut by the cutter. The ends of the sticks or pins to be embedded in the candy are preferably tapered and project beyond one edge of the plate 21, as is shown clearly in Figs. 1 and 2. The opposed edge of the plate is rolled to provide a hand grip 22 for facilitating the handling of the lifter.

From the above description it will be obvious that this lifter may be used in connection with a cutter, not shown, and when so used will have the sticks 24 disposed between the blades, so that when the pliable strip of candy is laid over these blades and sticks, the forcing down of the movable cutting section of the cutter will operate to permanently embed the sticks in the candy so that when the lifter is removed all of the pieces of candy cut will be simultaneously removed from the cutter and they may be individually taken from the lifter 20 by slipping out the sticks from the loops 23, and the lifter is then ready to receive other sticks for another operation.

In Figs. 4 and 5 a plate 25 of sheet metal is shown having inturned or rolled side edges 28 and stick receiving seats formed by out-struck tongues 26, each series comprising a plurality of these seats, two being preferably used, and each seat is composed of two tongues extending toward each other as is shown clearly in Fig. 4 and which are off-set from the plate 25 a sufficient distance to permit the sticks 27 to be slipped between them and the plate in the same manner that the sticks 24 are used in connection with plate 21.

From the foregoing description, taken in connection with the accompanying drawings, the advantages of the construction and of the method of operation will be readily apparent to those skilled in the art to which the invention appertains and while I have described the principle of operation of the invention together with the device which I now consider to be the best embodiment thereof, I desire to have it understood that the device shown is merely illustrative and that such changes may be made as are within the scope of the claimed invention.

Having thus described my invention, what I claim as new and desire to secure by Letters Patent is:

1. A candy lifter comprising a flat plate and means for detachably connecting a plurality of sticks thereto in approximately the same plane therewith whereby the sticks will project beyond said means.

2. A portable candy handling device comprising a plate upon which a plurality of removable sticks are fastened with their ends projecting beyond said plate whereby the plate may be transported together with the sticks which are adapted to be attached to candies without the candy contacting with said plate.

3. A candy lifter comprising a plate having a plurality of longitudinally spaced series of loops carried thereby, the loops of the series extending transversely of the plate and spaced apart, for mounting a plurality of removable pins slidable in said loops with corresponding ends projecting beyond one edge of the plate.

4. A portable candy handling device comprising a plate means for removably supporting a plurality of sticks thereon, and one edge of said plate being folded upon itself to provide an abutment to engage with corresponding ends of the sticks to cause their opposite ends to project beyond the plate.

5. A candy handling device comprising a supporting member and a plurality of stirrups thereon, for removably connecting a plurality of pins or sticks to the member which pins or sticks are adapted to be permanently attached to candies.

6. A candy handling device comprising a supporting member having a plurality of stirrups struck therefrom to removably receive a plurality of sticks or pins which are adapted to be permanently attached to candies.

7. A candy handling device comprising a flat plate having means for removably retaining a plurality of sticks in approximately the same plane therewith.

In testimony whereof I affix my signature in presence of two witnesses.

GEORGE H. SCHMAND.

Witnesses:
   EUGENIA M. SCHMAND,
   C. V. SCOTT.